(12) United States Patent
Li (10) Patent No.: US 12,125,099 B2
(45) Date of Patent: Oct. 22, 2024

(54) METHOD FOR INFORMATION PROCESSING AND DISPLAYING BASED ON GUI, COMMUNICATION SYSTEM AND USER EQUIPMENT

(71) Applicant: SHENZHEN FUTU NETWORK TECHNOLOGY CO., LTD, Guangdong (CN)

(72) Inventor: Xiang Li, Shenzhen (CN)

(73) Assignee: SHENZHEN FUTU NETWORK TECHNOLOGY CO., LTD, Guangdong (CN)

( * ) Notice: Subject to any disclaimer, the term of this patent is extended or adjusted under 35 U.S.C. 154(b) by 146 days.

(21) Appl. No.: 17/564,249

(22) Filed: Dec. 29, 2021

(65) Prior Publication Data

US 2022/0156832 A1    May 19, 2022

Related U.S. Application Data (63) Continuation of application No. PCT/CN2021/106276, filed on Jul. 14, 2021.

(30) Foreign Application Priority Data

Jul. 16, 2020   (CN) .......................... 202010689241.7

(51) Int. Cl.
*G06Q 40/04*       (2012.01)
*G06F 21/32*       (2013.01)
(Continued)

(52) U.S. Cl.
CPC ............ *G06Q 40/04* (2013.01); *G06F 21/32* (2013.01); *G06V 10/267* (2022.01); *G06V 10/28* (2022.01);
(Continued)

(58) Field of Classification Search
CPC .... G06Q 40/04; G06V 40/171; G06V 40/172; G06V 10/267; G06V 10/28; G06V 10/993; G06F 21/32
(Continued)

(56) References Cited

U.S. PATENT DOCUMENTS 6,772,132 B1 *   8/2004   Kemp, II ............... G06Q 40/04
                                                                 715/814
2006/0080215 A1 *  4/2006   Warsaw ................. G06Q 40/04
                                                                 705/37
(Continued)

FOREIGN PATENT DOCUMENTS

CN         103366307 A      10/2013
CN         104424599 A       3/2015
(Continued)

OTHER PUBLICATIONS

The First Office Action in counterpart China Application No. 202010689241.7, dated Apr. 26, 2023.
(Continued)

*Primary Examiner* — Paul S Schwarzenberg (57) ABSTRACT

Disclosed is a method and an order generation system for a software interface, the method including: by a UE, collecting operation information about a target object, and determining an operation type and an operation coordinate of the target object on the software interface; acquiring a coordinate set in a price coordinate system of the software interface; calculating differences between the operation coordinate and the plurality of coordinate values to obtain a plurality of difference values, extracting a minimum difference value from the plurality of difference values, and obtaining a first price corresponding to the minimum difference value; and generating a first straight line matching the first price and the operation type, and sending a transaction request including the first price and the operation type
(Continued)

to a background server after superimposing the first straight line onto the software interface.

13 Claims, 4 Drawing Sheets

(51) Int. Cl.
*G06V 10/26* (2022.01)
*G06V 10/28* (2022.01)
*G06V 10/98* (2022.01)
*G06V 40/16* (2022.01)

(52) U.S. Cl.
CPC .......... *G06V 10/993* (2022.01); *G06V 40/171* (2022.01); *G06V 40/172* (2022.01)

(58) Field of Classification Search
USPC .......................................................... 705/37
See application file for complete search history.

(56) References Cited

U.S. PATENT DOCUMENTS

| | | | | |
|---|---|---|---|---|
| 2013/0325692 | A1* | 12/2013 | Chassin | G06Q 30/08 705/37 |
| 2015/0317731 | A1* | 11/2015 | Warsaw, III | G06Q 40/04 705/37 |
| 2018/0197242 | A1* | 7/2018 | Lutnick | G06Q 30/08 |
| 2020/0043094 | A1* | 2/2020 | Sallent | G06Q 40/04 |
| 2020/0364789 | A1* | 11/2020 | Ram | G06Q 40/00 |

FOREIGN PATENT DOCUMENTS

| | | |
|---|---|---|
| CN | 105302427 A | 2/2016 |
| CN | 106250300 A | 12/2016 |
| CN | 106651581 A | 5/2017 |
| CN | 108804005 A | 11/2018 |
| CN | 109815349 A | 5/2019 |
| CN | 109857305 A | 6/2019 |
| CN | 109918014 A | 6/2019 |
| CN | 110245868 A | 9/2019 |
| CN | 110443663 A | 11/2019 |
| CN | 110992139 A | 4/2020 |
| CN | 111026991 A | 4/2020 |
| CN | 111930826 A | 11/2020 |
| TW | 201324418 A1 | 6/2013 |

OTHER PUBLICATIONS

The Second Office Action in counterpart China Application No. 202010689241.7, dated Oct. 25, 2023.

* cited by examiner

METHOD FOR INFORMATION PROCESSING AND DISPLAYING BASED ON GUI, COMMUNICATION SYSTEM AND USER EQUIPMENT

CROSS-REFERENCE TO RELATED APPLICATIONS

The present application is a continuation of International application NO. PCT/CN2021/106276, filed on Jul. 14, 2021, which claims priority to Chinese patent application No. 202010689241.7 filed on Jul. 16, 2020, by SHENZHEN FUTU NETWORK TECHNOLOGY CO., LTD., entitled "ORDER GENERATION METHOD AND SYSTEM FOR SOFTWARE INTERFACE", which are incorporated herein by reference in their entireties.

FIELD

The present disclosure relates to the field of financial technology, more particularly, to an order generation method and an order generation system for a software interface.

BACKGROUND

Financial software, such as stock software, security analysis software, or a security decision-making system, features a real-time disclosure of stock information, including market information and news, enabled by software functions, and hence early stock software is sometimes called market software. Essentially, stock software makes statistical calculations on the market information and data and provides statistics (charts), graphs (index graphs), and texts (news links) according to a certain analysis model, and users interpret these conclusions according to a certain technical analysis theory. Some easy-to-use software are also available and give direct suggestions for buying and selling, most of which analyze the trend of the whole stock market from a professional perspective.

It is not practical yet to generate a financial order on an interface of conventional financial software through coordinates of the software interface, which leads to poor operability and experience for a user.

SUMMARY

Technical Problem

The embodiments of the present disclosure disclose an order generation method for a software interface, which can determine the coordinates of the software interface on the basis of user operation information, generate a financial order automatically, and improve the operability and experience for the user.

Technical Solution

A first aspect of the embodiments of the present disclosure provides an order generation method for a software interface, the method being applied to a user equipment (UE) and including steps of:
  collecting, by the UE, operation information about a target object, and determining, by the UE, an operation type and an operation coordinate of the target object on the software interface according to the operation information;
  acquiring, by the UE, a coordinate set in a price coordinate system of the software interface, the coordinate set including a plurality of coordinate values; calculating, by the UE, differences between the operation coordinate and the plurality of coordinate values to obtain a plurality of difference values, extracting, by the UE, a minimum difference value from the plurality of difference values, and obtaining, by the UE, a first price corresponding to the minimum difference value; and
  generating, by the UE, a first straight line matching the first price and the operation type, and sending, by the UE, a transaction request to a background server after superimposing, by the UE, the first straight line onto the software interface, the transaction request including the first price and the operation type.

A second aspect of the embodiments of the present disclosure provides a transaction system, including: a user equipment (UE) and a background server,
  the UE is configured to collect operation information about a target object, and determine an operation type and an operation coordinate of the target object on the software interface based on the operation information; acquire a coordinate set in a price coordinate system of the software interface, the coordinate set including a plurality of coordinate values; calculate differences between the operation coordinate and the plurality of coordinate values to obtain a plurality of difference values, extract a minimum difference value from the plurality of difference values, and obtain a first price corresponding to the minimum difference value; and generate a first straight line matching the first price and the operation type, and send a transaction request to a background server after superimposing the first straight line onto the software interface, the transaction request including the first price and the operation type; and
  the background server is configured to refresh lines of a price chart on the software interface based on the first price and the operation type and return the refreshed price chart to the UE for display.

A third aspect of the embodiments of the present disclosure provides a user equipment, including:
  a collecting unit configured to collect operation information about a target object;
  a processing unit configured to: determine an operation type and an operation coordinate of the target object on the software interface based on the operation information; acquire a coordinate set in a price coordinate system of the software interface, the coordinate set including a plurality of coordinate values; calculate differences between the operation coordinate and the plurality of coordinate values to obtain a plurality of difference values, extract a minimum difference value from the plurality of difference values, and obtain a first price corresponding to the minimum difference value; and generate a first straight line matching the first price and the operation type and superimpose the first straight line onto the software interface; and
  a communication unit configured to send a transaction request to a background server, the transaction request including the first price and the operation type.

A fourth aspect of the embodiments of the present disclosure provides a terminal, including a processor, a memory, a communication interface, and one or more programs stored in the memory and configured to be executed by the processor, the programs including instructions for performing the steps of the method of the first aspect.

A fifth aspect of the embodiments of the present disclosure discloses a computer-readable storage medium having a computer program for electronic data exchange thereon, where the computer program causes a computer to perform the method of the first aspect.

A sixth aspect of the embodiments of the present disclosure discloses a computer program product including a non-transitory computer-readable medium having a computer program stored thereon, and the computer program is executable to cause a computer to perform some or all of the steps as described in the first aspect of the embodiments of the present disclosure. The computer program product may be a software installation package.

Advantageous Effects

By implementing the embodiments of the present disclosure, the UE set forth in the technical solution is configured to: collect operation information about a target object, and determine an operation type and an operation coordinate of the target object at the software interface according to the operation information; acquire a coordinate set in a price coordinate system of the software interface, the coordinate set including a plurality of coordinate values; calculate differences between the operation coordinate and the plurality of coordinate values to obtain a plurality of difference values, extract a minimum difference value from the plurality of difference values, and obtain a first price corresponding to the minimum difference value; and generate a first straight line matching the first price and the operation type, and send a transaction request to a background server after superimposing the first straight line onto the software interface. In this way, the target object can do the line-marked transaction according to the operation information from the user, and the amount of the transaction corresponds to the transaction price shown at the software interface, which avoids the problem that a transaction cannot be done at the transaction price; therefore, the technical solution of the present disclosure realizes the financial transaction shown at the software interface using coordinate values, which facilitates the user's operation, and improves the user experience.

BRIEF DESCRIPTION OF DRAWINGS

The drawings used in the embodiments of the present disclosure are described below.

DESCRIPTION OF EMBODIMENTS

The embodiments of the present disclosure will be described below with reference to the accompanying drawings.

The term "and/or", as used herein, describes merely an association of associated objects and indicates that there may be three cases, for example, "A and/or B" may indicate A alone, both A and B, and B alone. In addition, the character "/", as used herein, indicates an "or" association between objects.

The term "plurality" in the embodiments of the present disclosure means two or more. The terms "first", "second", and so on in the embodiments of the present disclosure are intended merely to illustrate and differentiate the objects described, without indicating an order or a particular limitation on the number of devices in the embodiments of the present disclosure or limiting the embodiments of the present disclosure. The term "connection" in the embodiments of the present disclosure refers to various connections, such as direct connection or indirect connection to enable communication between devices, which are not limited in the embodiments of the present disclosure.

A terminal in the embodiments of the present disclosure may refer to various forms of UEs, access terminals, user units, user stations, mobile stations, remote stations, remote terminals, mobile devices, user terminals, terminal equipment, wireless communication devices, user agents, or a user apparatuses. The terminal equipment may also be cellular phones, cordless phones, session initiation protocol (SIP) phones, wireless local loop (WLL) stations, personal digital assistants (PDAs), handheld devices with wireless communication capabilities, computing devices or other processing devices connected to wireless modems, on-board devices, wearable devices, terminal devices in future 5G networks or public land mobile networks (PLMNs) evolving in the future, and the like, which are not limited by the embodiments of the present disclosure.

Figure 1:
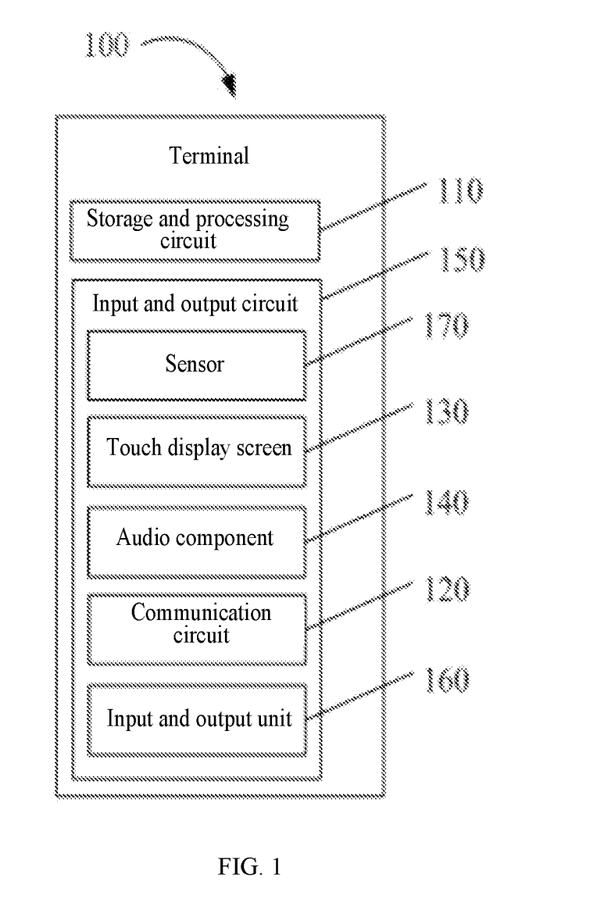
FIG. 1 is a schematic structural diagram of a terminal provided in an embodiment of the present disclosure.

With reference to FIG. 1, which is a schematic structural diagram of a terminal disclosed in an embodiment of the present disclosure, a terminal 100 includes a storage and processing circuit 110, and a sensor 170 connected to the storage and processing circuit 110. The sensor 170 may include a camera, a distance sensor, a gravity sensor, etc. The terminal 100 of the present disclosure may include two transparent display screens arranged at a rear side and a front side of the terminal 100, some or all of components between the two transparent display screens may also be transparent, and when observed, the terminal 100 may thus be a transparent terminal, or may be a hollow-out terminal if some of the components are transparent.

The terminal 100 may include a control circuit, which may include the storage and processing circuit 110. The storage and processing circuit 110 may be a memory, such as hard disk drive memory, a non-volatile memory (e.g., a flash memory or another electronically programmable read-only memory used to form a solid-state drive, etc.), a volatile memory (e.g., a static or a dynamic random access memory, etc.), and the like, which are not limited by the embodiments of the present disclosure. A processing circuit in the storage and processing circuit 110 may be configured to control the operation of the terminal 100. The processing circuit may be implemented on the basis of one or more microprocessors, microcontrollers, digital signal processors, baseband processors, power management units, audio codec chips, application-specific integrated circuits, display driver integrated circuits, etc.

The storage and processing circuit 110 may be configured to execute software in the terminal 100, such as an Internet browsing application, a Voice over Internet Protocol (VOIP) phone call application, an email application, a media-playing application, operating system functions, etc. These software apps may be configured to perform control operations such as camera-based image acquisition, ambient light measurement based on an ambient light sensor, proximity sensor measurement based on a proximity sensor, information display functions implemented based on status indicators such as status indicating lights of light-emitting diodes, touch event detection based on a touch sensor, functions associated with displaying information on multiple (e.g., layered) display screens, operations associated with performing wireless communication functions, operations associated with collecting and generating audio signals, control operations associated with collecting and processing data of button press events, as well as other functions in the terminal 100, and the like, which are not limited by the embodiments of the present disclosure.

The terminal 100 may include an input and output circuit 150. The input and output circuit 150 may be configured to enable the terminal 100 to input and output data, i.e., to allow the terminal 100 to receive data from external devices and also allow the terminal 100 to output data therefrom to external devices. The input and output circuit 150 may further include a sensor 170. The sensor 170 includes a vein recognition module, and can further include an ambient light sensor, a proximity sensor based on light and capacitance, a fingerprint recognition module, a touch sensor (for example, a light-based touch sensor and/or a capacitive touch sensor, where the touch sensor can be a part of the touch control display screen, or an independent touch sensor structure for use), an acceleration sensor, a camera, and other sensors, etc. The camera can be a front camera or a rear camera; the fingerprint recognition module can be integrated below the display screen for collecting a fingerprint image; and the fingerprint recognition module can be an optical fingerprint module or the like, which are not limited herein. The front camera may be disposed below a front display screen, and the rear camera may be disposed below a rear display screen. Alternatively, the front camera or rear camera mentioned above may not be provided integrally with the display screens, and in practical applications, the front camera or rear camera mentioned above may be a lifting structure, and the embodiments of the present disclosure do not limit the specific structure of the front camera or rear camera mentioned above.

The input and output circuit 150 may further include one or more display screens, and in the case of multiple display screens, for example, two display screens, one display screen may be disposed on the front side of the terminal 100 and another display screen may be disposed on the rear side of the terminal 100, such as a display screen 130. The display screen 130 may include one or a combination of more of a liquid crystal display screen, a transparent display screen, an organic light-emitting diode display screen, an electronic ink display screen, a plasma display screen, or a display screen using other display technologies. The display screen 130 may include an array of touch sensors (i.e., the display screen 130 may be a touch-sensitive display screen). The touch sensor may be a capacitive touch sensor formed from an array of transparent touch sensor electrodes, such as indium tin oxide (ITO) electrodes, or a touch sensor formed using other touch technologies, such as sonic touch, pressure-sensitive touch, resistive touch, optical touch, and the like, which are not limited by the embodiments of the present disclosure.

The terminal 100 may further include an audio component 140. The audio component 140 may be configured to provide audio input and output functions for the terminal 100. The audio components 140 in the terminal 100 may include a speaker, a microphone, a buzzer, a tone generator, and other components for generating and detecting sound.

A communication circuit 120 may be configured to provide the terminal 100 with the ability to communicate with external devices. The communication circuit 120 may include analog and digital input/output interface circuits, and a wireless communication circuit based on radio frequency signals and/or optical signals. The wireless communication circuit in the communication circuit 120 may include a radio frequency transceiver circuit, a power amplifier circuit, a low noise amplifier, a switch, a filter, and an antenna. For example, the wireless communication circuit in the communication circuit 120 may include a circuit for supporting near field communication (NFC) by transmitting and receiving near field coupled electromagnetic signals. For example, the communication circuit 120 may include a near field communication antenna and a near field communication transceiver. The communication circuit 120 may further include a cellular telephone transceiver and an antenna, a wireless local area network transceiver circuit and an antenna, etc.

The terminal 100 may further include a battery, a power management circuit, and other input and output units 160. The input and output units 160 may include buttons, operating levers, click wheels, scroll wheels, touch pads, keypads, keyboards, cameras, light-emitting diodes, and other status indicators, etc.

A user may input commands through the input and output circuit 150 to control the operation of the terminal 100 and may use the output data of the input and output circuit 150 to enable receiving of status information and other outputs from the terminal 100.

Figure 2:
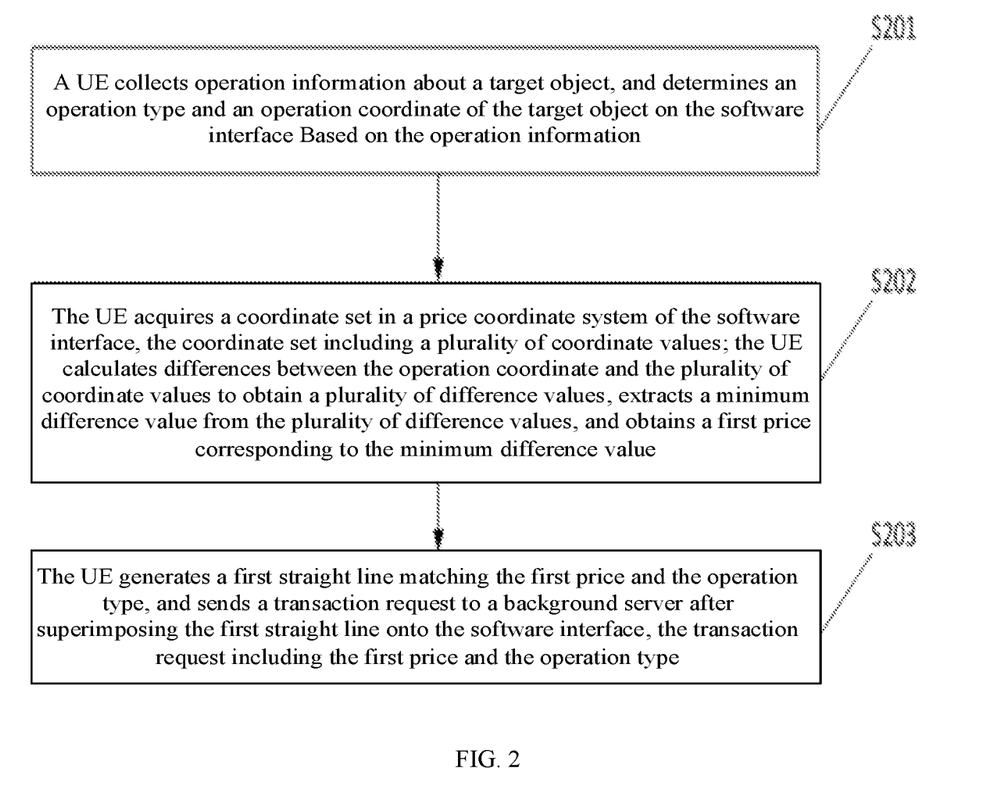
FIG. 2 is a flow chart of an order generation method for a software interface provided in an embodiment of the present disclosure.

With reference to FIG. 2, where an order generation method for a software interface is provided, the method is applied to a user equipment (UE), and the specific structure of the UE can be as shown in FIG. 1. The method includes the steps as follows.

At step S201, the UE collects operation information about a target object, and determines an operation type and an operation coordinate of the target object on the software interface based on the operation information.

The target object in step S201 may be an operating user such as a financial operator or a voice operation robot. The operation information includes but is not limited to touch information from the target object on a touch display screen, and in practice, the operation information mentioned above may further include mouse click information.

The operation type in step S201 includes but is not limited to a financial transaction; the financial transaction includes but is not limited to one or any combination of a stock transaction, an option transaction, or a warrant transaction, either for buying or to selling.

The operation coordinate in step S201 may be specifically a coordinate of a point where the straight line corresponding to the operation type intersects a price coordinate system. For example, if the operation type is stock buying, and a coordinate of a point where a straight line corresponding to the stock buying intersects the price coordinate system (generally a Y axis) is the operation coordinate.

At step S202, the UE acquires a coordinate set in a price coordinate system of the software interface, the coordinate set including a plurality of coordinate values; and the UE calculates differences between the operation coordinate and the plurality of coordinate values to obtain a plurality of difference values, extracts a minimum difference value from the plurality of difference values, and obtains a first price corresponding to the minimum difference value.

A method for acquiring the coordinate set in step S202 may specifically include: determining, by the UE, a financial display region of the software interface, acquiring, by the UE, all coordinate values corresponding to all transaction prices in the financial display region, and grouping, by the UE, said all coordinate values into one set to obtain the coordinate set.

As a practical example, if five specific prices are shown in the price coordinate system of the financial display region of a current software interface, then five coordinates corresponding to the five specific prices are determined to be a coordinate set.

Calculating, by the UE, differences between the operation coordinate and the plurality of coordinate values to obtain a plurality of difference values mentioned above may specifically include: calculating, by the UE, five difference values between the five coordinates and the operation coordinate (i.e., the differences between Y-axis coordinates).

At step S203, the UE generates a first straight line matching the first price and the operation type, and sends a transaction request to a background server after superimposing the first straight line onto the software interface, the transaction request including the first price and the operation type.

Step S203 may be implemented by a method including: generating, by the UE, the first straight line parallel to an X axis, a Y-axis coordinate value of the first straight line being a Y-axis coordinate value corresponding to the first price; superimposing, by the UE, the first straight line onto the software interface (e.g., through overlaying of layers, with the first straight line in the top layer), and then sending, by the UE, the transaction request to the background server.

The UE set forth in the technical solution of the present disclosure is configured to: collect operation information about a target object, and determine an operation type and an operation coordinate of the target object at the software interface based on the operation information; acquire a coordinate set in a price coordinate system of the software interface, the coordinate set including a plurality of coordinate values; calculate differences between the operation coordinate and the plurality of coordinate values to obtain a plurality of difference values, extract a minimum difference value from the plurality of difference values, and obtain a first price corresponding to the minimum difference value; and generate a first straight line matching the first price and the operation type, and send a transaction request to a background server after superimposing the first straight line onto the software interface. In this way, the target object can realize the line-marked transaction according to the operation information from the user, and the amount of the transaction corresponds to the transaction price at the software interface, which avoids the problem that a transaction cannot be done at the transaction price; therefore, the technical solution of the present disclosure realizes the financial transaction on the software interface using coordinate values, which facilitates the user's operation, and improves the user experience.

Optionally, the above method further includes: acquiring, by the UE, a window message sent by the target object, acquiring, by the UE, a second straight line responding to the window message and a state the second straight line is in, and terminating, by the UE, the window message when the second straight line is in a predetermined state.

Such a solution can prevent errors in the object to be edited, and the predetermined state mentioned above can specifically include a fact that a window message is terminated; if the window message is terminated, and the current operation is determined to be a non-order modification, then the window message for a newly generated straight line (i.e., the second straight line) is terminated, and the responding of the second straight line is stopped (i.e., to stop generating the second straight line). If the window message is not terminated, and the current operation is determined to be generation of a new order, then the second straight line is newly generated, namely, to respond to the window message. This avoids the problem of false responses.

In some cases, where the user triggers a click, multiple lines may respond simultaneously. For example, a user drags a certain line and then releases the line, and a window message (WM_LBUTTONUP) is triggered then; moreover, upon receiving WM_LBUTTONUP, it may be considered as a click on a certain area of a chart by a user for generating an order; in other words, the original intention of the user who drags the certain line is to modify the order, however, a new order is generated, namely, an additional straight line, e.g., the second straight line, is generated, which is obviously unreasonable. To avoid operational errors, the method described above prevents erroneous responses to messages by terminating message delivery. When a window message is passed to a line below through "Drawing Line to Generate Order Management", whether this window message is terminated is determined at first; if the window message is terminated, the newly generated second straight line is determined to be an erroneous operation because the window message would have not been terminated if the newly generated second straight line was correct; if the window message is not terminated, the newly generated second straight line is determined to be a normal operation, which means the newly generated second straight line is correct, and then a response is made to the second straight line.

Optionally, the above method may further include: acquiring, by the UE, a window message sent by the target object, identifying, by the UE, the target object to determine a first identity of the target object, and extracting, by the UE, weight value data corresponding to the first identity; and extracting, by the UE, data and information about each straight line on the software interface, generating, by the UE, a respective piece of input data of the data and information about each straight line, performing, by the UE, a calculation on the respective piece of input data and the weight value data to obtain a respective calculation result for the respective piece of input data, determining, by the UE, a third straight line matching the window message by comparing the respective calculation result with a predetermined result, and determining, by the UE, the third straight line as a straight line responding to the window message.

Identifying the target object to determine a first identity of the target object in step S202 may specifically include: E1, acquiring a target facial image from a target image of the target object; E2, performing an authentication on the target facial image; and E3, determining that the target object is the first identity corresponding to a predetermined human face module when the authentication of the target facial image passes.

In a specific implementation, a predetermined human face template can be pre-stored in the terminal 100, and an original image of the target object can be acquired with a camera; further, when the target facial image successfully matches the predetermined human face template, the terminal 100 can determine the first identity of the target object, or otherwise, the terminal 100 does not determine the first identity of the target object. In this way, recognition of the identity of the target object is enabled to determine whether the first identity is a patient who has an appointment, thereby preventing others from starting the remote medical treatment.

Further, in one possible example, performing the authentication on the target facial image in step E2 may include following steps:

E21: performing a regional division on the target facial image to obtain a target facial region, wherein the target facial region is a regional image of a human face;

E22: binarizing the target facial region to obtain a binarized facial image;

E23: dividing the binarized facial image into a plurality of regions each having a same area greater than a predetermined area size;

E24: performing feature point extraction on the binarized facial image to obtain a plurality of feature points;

E25: determining a feature point distribution density corresponding to each of the plurality of regions based on the plurality of feature points to obtain a plurality of feature point distribution densities;

E26: determining a target mean square error based on the plurality of feature point distribution densities;

E27: determining a target quality evaluation value corresponding to the target mean square error according to a predetermined mapping relationship between mean square errors and quality evaluation values;

E28: performing an image enhancement on the target facial image when the target quality evaluation value is smaller than a predetermined quality evaluation value, and matching the target facial image after the image enhancement with a predetermined human face template to obtain a matching value; and E29: determining that the authentication of the target facial image passes when the matching value is greater than a predetermined threshold value.

In a specific implementation, the predetermined threshold value and the predetermined area size mentioned above can be set by the user himself/herself or by default of the system, and the predetermined human face template can be pre-stored in the terminal 100. The terminal 100 can perform a regional division on the target facial image to obtain the target facial region which may be a region that includes only a human face and excludes any other background, namely, a regional image having only a human face. Further, the target facial region is binarized to obtain a binarized facial image, and thus the complexity of the image can be reduced; and the binarized facial image is divided into a plurality of regions each having the same area greater than the predetermined area size. Furthermore, feature points can be extracted from the binarized facial image to obtain a plurality of feature points, and an algorithm for feature point extraction can be at least one of scale-invariant feature transform (SIFT), the SURF algorithm, the Pyramid algorithm, the Harris corner detection, or others, which are not limited herein.

Furthermore, the terminal 100 can determine a feature point distribution density corresponding to each of the plurality of regions according to the plurality of feature points to obtain a plurality of feature point distribution densities, and determine a target mean square error based on the plurality of feature point distribution densities; the terminal 100 can pre-store a predetermined mapping relationship between mean square errors and quality evaluation values, determine a target quality evaluation value corresponding to the target mean square error according to the predetermined mapping relationship between mean square errors and quality evaluation values, where a smaller mean square error indicates a greater quality evaluation value; when the target quality evaluation value is greater than the predetermined quality evaluation value, directly match the target facial image with the predetermined human face template, when a matching value therebetween is greater than the predetermined threshold value, determine that authentication of the target facial image passes, or otherwise, determine that the authentication of the target facial image fails.

Furthermore, when the target quality evaluation value is smaller than the predetermined quality evaluation value, the terminal may perform an image enhancement on the target facial image and match the target facial image after the image enhancement with the predetermined human face template; when the matching value therebetween is greater than the predetermined threshold value, determine that the authentication of the target facial image passes, or otherwise, determine that the authentication of the target facial image fails.

Extracting the weight value data corresponding to the first identity mentioned above may specifically include: configuring in advance a plurality of pieces of weight value data corresponding to a plurality of identities, and extracting, from the plurality of pieces of weight value data corresponding to the plurality of identities, the weight value data corresponding to the first identity.

Extracting, by the UE, the data and information about each straight line on the software interface, and generating, by the UE, the respective piece of input data of the data and information about each straight line mentioned above may specifically include: determining, by the UE, a first size of the weight value data, determining, by the UE, a second size matching the first size, processing, by the UE, the data and information about each straight line to obtain a plurality of element values matching the second size, and arranging, by the UE, the plurality of element values to obtain the input data of the data and information about each straight line.

As a practical example, the weight value data is a row vector, the first size of the row vector includes four values, then the second size matching the first size is a column vector, and the column vector also includes four values; a type matching each element of the weight value data is determined, for example, if the first element value of the row vector is a price element weight value, then the first element value of the column vector can also be a price; if the second element value of the row vector is a time element weight value, then the second element value of the column vector can also be a time value, and the column vector can be obtained as such. The specific embodiments of the present disclosure do not limit the specific form and meaning of the first size and the second size of the weight value data mentioned above.

Optionally, the above method may further include: identifying, by the UE, the software interface to determine operation types of all straight lines, and grouping straight lines of a same operation type into a same set; arranging (in an ascending or descending order), by the UE, data and information of a plurality of straight lines in the same set to obtain a queue, and calculating, by the UE, a price difference between every two adjacent straight lines in the queue to obtain w price differences, the w price differences being w similarities; and combining n straight lines (n adjacent lines) with similarities smaller than a similarity threshold value into one straight line to be displayed on the software interface.

For example, if n=3, the first two lines of the three lines are adjacent to each other and so are the latter two lines of the three lines, then the three straight lines are determined to be 3 adjacent lines. If n=5, then each of the 5 straight lines can find another line adjacent thereto from the 5 straight lines; otherwise, if one of the 5 straight lines is not adjacent to any other straight line of the 5 straight lines, then N≠5.

Optionally, the above method may further include: ranking, according to a predetermined rule, n pieces of information corresponding to the n straight lines combined into one straight line, and then displaying the n pieces of information in the ranked order in an information display region for said one straight line.

The predetermined rule includes a descending order of n time values of the n lines, an ascending order of then time values of then lines, a descending order of n prices of the n lines, or an ascending order of the n prices of the n lines.

The n pieces of information mentioned above include but are not limited to one or more of n time values (which may be a line-marked time) or n prices.

Optionally, the similarities specifically include price difference values between any two adjacent straight lines in the plurality of straight lines, and the similarity threshold value mentioned above may be a variable threshold value that is dynamically adjusted by means of a magnification of the software interface; specifically, a list of the magnifications and their corresponding similarity threshold values may be provided; for example, for stock A, when the display magnification of the software interface is 1, the similarity threshold value may be CNY 0.05; when the display magnification of the software interface is 5, the similarity threshold value may be CNY 0.25, and the like. Theoretically, the similarity threshold value is determined to be too small and needs to be increased (for example, increased by one grade) if two straight lines overlap with each other at the current display magnification of the software interface; the similarity threshold value is determined to be too great and needs to be decreased (for example, decreased by one grade) if two straight lines do not overlap with each other at the current display multiple of the software interface; such an adjustment can be repeated to arrive at a proper similarity threshold value.

Figure 3:
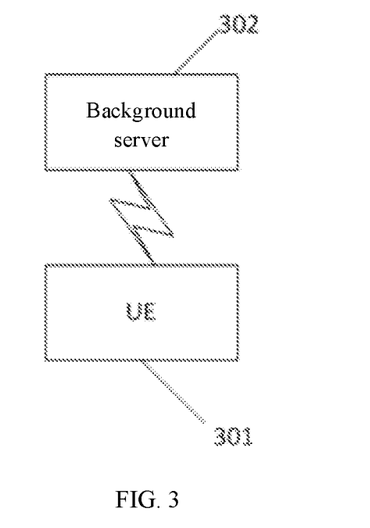
FIG. 3 is a schematic structural diagram of a transaction system provided in an embodiment of the present disclosure.

With reference to FIG. 3, where a transaction system including a UE 301 and a background server 302 is provided.

The UE 301 is configured to collect operation information about a target object, and determine an operation type and an operation coordinate of the target object at the software interface based on the operation information; acquire a coordinate set in a price coordinate system of the software interface, the coordinate set including a plurality of coordinate values; calculate differences between the operation coordinate and the plurality of coordinate values to obtain a plurality of difference values, extract a minimum difference value from the plurality of difference values, and obtain a first price corresponding to the minimum difference value; and generate a first straight line matching the first price and the operation type, and send a transaction request to a background server after superimposing the first straight line onto the software interface, the transaction request including the first price and the operation type.

The background server 302 is configured to refresh lines of a price chart at the software interface according to the first price and the operation type and return the refreshed price chart to the UE for display.

A detailed solution of the embodiment shown in FIG. 2 can serve as a reference for the specific embodiment of the UE 301 mentioned above, which will not be described in detail here.

Figure 4:
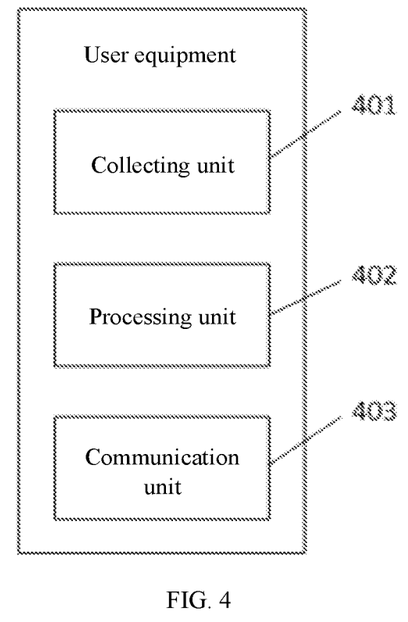
FIG. 4 is a schematic diagram of a user equipment provided in an embodiment of the present disclosure.

With reference to FIG. 4, where a user equipment is provided, the user equipment includes: a collecting unit 401, a processing unit 402, and a communication unit 403.

The collecting unit 401 is configured to collect operation information about a target object.

The processing unit 402 is configured to: determine an operation type and an operation coordinate of the target object at the software interface according to the operation information; acquire a coordinate set in a price coordinate system of the software interface, the coordinate set including a plurality of coordinate values; calculate differences between the operation coordinate and the plurality of coordinate values to obtain a plurality of difference values, extract a minimum difference value from the plurality of difference values, and obtain a first price corresponding to the minimum difference value; and generate a first straight line matching the first price and the operation type and superimpose the first straight line onto the software interface.

The communication unit 403 is configured to send a transaction request to a background server, the transaction request including the first price and the operation type.

The specific functions enabled for the processing unit mentioned above can be seen in the description of the embodiment shown in FIG. 2 and will not be described again here.

Figure 5:
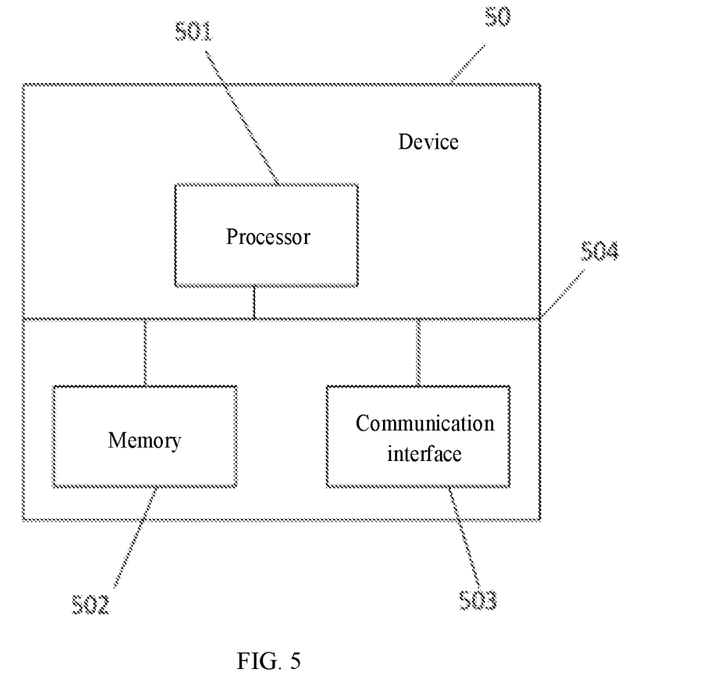
FIG. 5 is a schematic structural diagram of a device provided in an embodiment of the present disclosure.

With reference to FIG. 5, which shows a device 50 provided in an embodiment of the present disclosure, the device 50 includes a processor 501, a memory 502, and a communication interface 503, and the processor 501, the memory 502, and the communication interface 503 are interconnected through a bus 504.

The memory 502 includes but is not limited to a random access memory (RAM), a read-only memory (ROM), an erasable programmable read-only memory (EPROM), or a compact disc read-only memory (CD-ROM), and is used for relevant computer programs and data. The communication interface 503 is configured to receive and transmit data.

The processor 501 may be one or more central processing units (CPUs), and in the case where the processor 501 is a CPU, the CPU may be a single-core CPU or a multi-core CPU.

The processor 501 in the device 50 is configured to read computer program codes stored in the memory 502 to perform the operations of the method as shown in FIG. 2.

Embodiments of the present disclosure also provide a computer-readable storage medium having a computer program stored therein, and the computer program, when executed on a network device, implements the method flow shown in FIG. 2.

Embodiments of the present disclosure also provide a computer program product, which, when executed on a terminal, implements the method flow shown in FIG. 2.

Embodiments of the present disclosure also provide a terminal including a processor, a memory, a communication interface, and one or more programs stored in the memory and configured to be executed by the processor, the programs including instructions for performing the steps of the method of the embodiment shown in FIG. 2.

The solutions of the embodiments of the present disclosure have been described above mainly from the perspective of method implementation. It will be appreciated that the terminal may include corresponding hardware structures and/or software templates for performing the functions described above. Those skilled in the art should readily appreciate that the present disclosure can be implemented in hardware or a combination of hardware and computer software, in connection with the units and algorithm steps described in the examples of the embodiments disclosed herein. Whether a function is implemented as hardware or hardware driven by computer software depends upon the particular application and design constraints imposed on the solution. Skilled artisans may implement the described function in varying ways for each particular application, but such implementation should not be interpreted as causing a departure from the scope of the present disclosure.

Embodiments of the present disclosure may divide the terminal into functional units according to the method example mentioned above, for example, each functional unit is separated corresponding to a function, or two or more functions may be integrated in one processing unit. The integrated unit may be implemented in the form of a hardware or software functional unit. It should be noted that the division of units in the embodiments of the present disclosure is schematic, and is merely a logical and functional division, and other divisions may be possible in actual implementations.

It should be noted that for simplicity of description, each of the foregoing method embodiments has been presented as a combination of a series of acts, but those skilled in the art will recognize that the present disclosure is not limited by the order of acts described, as some steps may, in accordance with the present disclosure, be performed in other orders or concurrently. Besides, a person skilled in the art would also know that the embodiments described in the description are all preferred embodiments, and the acts and templates involved are not necessarily required by the present disclosure.

In the above embodiments, the description of each embodiment has its emphasis, and reference can be made to the description of other embodiments for omitted details of an embodiment.

It should be understood that in the several embodiments provided herein, the disclosed apparatus may be implemented in other ways. For example, the apparatus embodiments described above are merely illustrative, the division of units described above is merely a logical and functional division, and additional divisions are possible in actual implementations, for example, multiple units or components may be combined or integrated into another system, or some features may be omitted or not performed. In another aspect, the couplings or direct couplings or communicative connections shown or discussed with respect to each other may be indirect couplings or communicative connections through some interfaces, means, or units, and may be electrical or otherwise.

The units described above as separate components may or may not be physically separated, the components shown as units may be or may not be physical units, that is, they may be located in one place or distributed over a plurality of network units. Some or all of the units may be selected to achieve the object of the embodiments according to actual needs.

Furthermore, the functional units in the embodiment of the present disclosure may be integrated in one processing unit, or each functional unit exits independently in a physical form, or two or more units are integrated into one unit. The above integrated unit may be implemented in the form of a hardware or software functional unit.

The above integrated unit, if implemented in the form of a software functional unit and sold or used as a stand-alone product, may be stored in a computer-readable memory. From such an understanding, the technical solution of the present disclosure, either substantively or in any part contributing to the prior art, or all or part of the technical solution, may be embodied in the form of a software product stored in a memory, including instructions for causing a computer device, which may be a personal computer, a server or a network device, etc., to perform all or some of the steps of the above methods of the various embodiments of the present disclosure. The aforementioned memory includes: a USB flash disk, a read-only memory (ROM), a random access memory (RAM), a mobile hard disk, a magnetic or optical disk, and other mediums that can store program codes.

Those of ordinary skill in the art will appreciate that all or some of the steps in the various methods of the embodiments described above may be performed by a program that instructs associated hardware. The program may be stored in a computer-readable memory that may be a flash disk, a read-only memory (ROM), a random access device (RAM), a magnetic or optical disk, etc.

The embodiments of the present disclosure are described in detail above, and the principles and implementations of the present disclosure are described herein with specific examples. The above description of the embodiments is provided only to help understand the method of the present disclosure and the core idea thereof. Moreover, a person of ordinary skill in the art, according to the idea of the present disclosure, can modify the specific embodiments and application scopes. In summary, the disclosure of the present description should not be construed as limiting the present disclosure.

What is claimed is:

1. A method for information processing and displaying based on a graphic user interface (GUI), the method being applied in a user equipment (UE) and comprising steps of:

controlling, by a processing unit of the UE, a display unit of the UE to display a price value coordinate system GUI component on the GUI and display a price value set in the price value coordinate system GUI component on a coordinate set on the GUI, the coordinate set comprising a plurality of coordinate values, and the price value set comprising a plurality of price values, with each coordinate value corresponding to a respective price value in the price value set, wherein the UE stores, in a memory, a correspondence between the coordinate set on the GUI and the price value set in the price value coordinate system GUI component;

collecting, by a collecting unit of the UE, operation information about a user performing an operation of drawing a line using a mouse or a finger on the GUI under a price value coordinate system represented by the price value coordinate system GUI component, and determining, by the processing unit of the UE, an operation type and an operation coordinate of the user's operation of drawing the line on the GUI based on the operation information, wherein the operation type comprises at least one of a buying operation and a selling operation, and the operation coordinate is a coordinate of a point where a horizontal straight line corresponding to the operation of drawing the line intersects the price value coordinate system represented by the price value coordinate system GUI component;

calculating, by the processing unit of the UE based on the coordinate set on the GUI and the collected operation coordinate, differences between the operation coordinate and the plurality of coordinate values comprised in the coordinate set on the GUI to obtain a plurality of difference values, extracting, by the processing unit of the UE, a first coordinate value corresponding to a minimum difference value from the plurality of difference values, and obtaining, by the processing unit of the UE, a first price value corresponding to the first coordinate value based on the stored correspondence between the coordinate set on the GUI and the price value set in the price value coordinate system GUI component;

generating, by the processing unit of the UE, a first straight line matching the first price value and the operation type, wherein the first straight line is parallel to an X-axis and a Y-axis coordinate value of the first straight line is a Y-axis coordinate value corresponding to the first price value; and sending, by a communication unit of the UE, the first price value and the operation type to a background server after controlling, by the processing unit of the UE, the display unit of the UE to superimpose and display the first straight line onto the GUI; and acquiring, by the processing unit of the UE, a window message triggered by the user dragging a line on the GUI using the mouse or the finger and then releasing the line; determining, by the processing unit of the UE, whether the window message is terminated when the window message is passed down through an object-oriented program class to draw a second straight line; determining, by the processing unit of the UE when the window message is terminated, drawing of the second straight line as an erroneous operation, stopping, by the processing unit of the UE, responding of the second straight line, and sending, by the communication unit of the UE, no operation type of the second straight line and no price value of the second straight line to the background server; and determining, by the processing unit of the UE when the window message is not terminated, drawing of the second straight line as a correct operation and responding to the second straight line, and sending, by the communication unit of the UE, the operation type and the price value of the second straight line to the background server, wherein the method further comprises:

acquiring, by the UE, a window message sent by the user, identifying, by the UE, the user to determine a first identity of the user, and extracting, by the UE, weight value data corresponding to the first identity; and extracting, by the UE, price value information about each straight line on the GUI, generating, by the UE, a respective piece of input data of the price value information about each straight line, performing, by the UE, a calculation on the respective piece of input data of the price value information about each straight line and the weight value data to obtain a respective calculation result for the respective piece of input data, determining, by the UE, a third straight line matching the window message by comparing the respective calculation result with a predetermined result, and determining, by the UE, the third straight line as a straight line responding to the window message.

2. The method according to claim 1, wherein said identifying the user to determine the first identity of the user comprises:

acquiring a target facial image from a target image of the user;

performing an authentication on the target facial image; and determining that the user is the first identity corresponding to a predetermined face module, when the authentication of the target facial image passes.

3. The method according to claim 2, wherein said performing the authentication on the target facial image comprises:

performing a regional division on the target facial image to obtain a target facial region, wherein the target facial region is a regional image of a human face;

binarizing the target facial region to obtain a binarized facial image;

dividing the binarized facial image into a plurality of regions each having a same area greater than a predetermined area size;

performing feature point extraction on the binarized facial image to obtain a plurality of feature points;

determining a feature point distribution density corresponding to each of the plurality of regions based on the plurality of feature points to obtain a plurality of feature point distribution densities;

determining a target mean square error based on the plurality of feature point distribution densities;

determining a target quality evaluation value corresponding to the target mean square error according to a predetermined mapping relationship between mean square errors and quality evaluation values;

performing an image enhancement on the target facial image when the target quality evaluation value is smaller than a predetermined quality evaluation value, and matching the target facial image after the image enhancement with a predetermined human face template to obtain a matching value; and determining that the authentication of the target facial image passes when the matching value is greater than a predetermined threshold value.

4. The method according to claim 1, wherein said extracting the weight value data corresponding to the first identity comprises:

configuring in advance a plurality of pieces of weight value data corresponding to a plurality of identities; and extracting, from the plurality of pieces of weight value data corresponding to the plurality of identities, the weight value data corresponding to the first identity.

5. The method according to claim 1, wherein said extracting, by the UE, the data and information about each straight line on the GUI, and generating, by the UE, the respective piece of input data of the data and information about each straight line comprise:

determining, by the UE, a first size of the weight value data, determining a second size matching the first size, processing, by the UE, the data and information about each straight line to obtain a plurality of element values matching the second size, and arranging, by the UE, the plurality of element values to obtain the input data of the data and information about each straight line.

6. The method according to claim 1, further comprising:

identifying, by the UE, the GUI to determine operation types of all straight lines, and grouping straight lines of a same operation type into a same set; and performing, by the UE, similarity calculation on data and information about a plurality of straight lines in the same set to obtain w similarities, and combining n straight lines with similarities smaller than a similarity threshold value into one straight line to be displayed on the GUI.

7. The method according to claim 6, wherein said performing, by the UE, the similarity calculation on the data and information about the plurality of straight lines in the same set to obtain the w similarities comprises:

arranging, by the UE, the plurality of straight lines in the same set to obtain a queue, and calculating a price difference between every two adjacent straight lines in the queue to obtain w price differences, the w price differences being the w similarities.

8. The method according to claim 7, wherein said combining the n straight lines with the similarities smaller than the similarity threshold value into one straight line to be displayed on the GUI comprises:
determining a display magnification corresponding to the GUI, determining the similarity threshold value based on the display magnification, and comparing the w similarities with the similarity threshold value to determine the n straight lines with the similarities smaller than the similarity threshold value, wherein the n straight lines are all adjacent lines in the queue.

9. The method according to claim 6, further comprising:
ranking, according to a predetermined rule, n pieces of information corresponding to the n straight lines combined into said one straight line, and then displaying the n pieces of information in the ranked order in an information display region for said one straight line,
wherein the predetermined rule comprises a descending order of n time values of the n lines, an ascending order of the n time values of the n lines, a descending order of n prices of the n lines, or an ascending order of the n prices of the n lines.

10. The method according to claim 1, further comprising:
determining, by the UE, a financial display region of the GUI, acquiring, by the UE, all coordinate values corresponding to all transaction prices in the financial display region, and grouping, by the UE, said all coordinate values into one set to obtain the coordinate set.

11. The method according to claim 1, wherein said generating, by the processing unit of the UE, the first straight line matching the first price and the operation type and sending, by the communication unit of the UE, the first price value and the operation type to the background server after controlling, by the processing unit of the UE, the display unit of the UE to superimpose and display the first straight line onto the GUI comprise:
superimposing, by the UE, the first straight line onto the GUI; and sending, by the UE, the first price value and the operation type to the background server.

12. A communication system, comprising a user equipment (UE) and a background server, wherein
the UE is configured to control a display unit of the UE to display a price value coordinate system GUI component on a graphic user interface (GUI) and display a price value set in the price value coordinate system GUI component on a coordinate set on the GUI, the coordinate set comprising a plurality of coordinate values, and the price value set comprising a plurality of price values, with each coordinate value corresponding to a respective price value in the price value set, wherein the UE stores, in a memory, a correspondence between the coordinate set on the GUI and the price value set in the price value coordinate system GUI component; collect operation information about a user performing an operation of drawing a line using a mouse or a finger on the GUI under a price value coordinate system represented by the price value coordinate system GUI component, and determine an operation type and an operation coordinate of the user's operation of drawing the line on the GUI based on the operation information, wherein the operation type comprises at least one of a buying operation and a selling operation, and the operation coordinate is a coordinate of a point where a horizontal straight line corresponding to the operation of drawing the line intersects the price value coordinate system represented by the price value coordinate system GUI component; calculate, based on the coordinate set on the GUI and the collected operation coordinate, differences between the operation coordinate and the plurality of coordinate values comprised in the coordinate set on the GUI to obtain a plurality of difference values, extract a first coordinate value corresponding to a minimum difference value from the plurality of difference values, and obtain a first price value corresponding to the first coordinate value based on the stored correspondence between the coordinate set on the GUI and the price value set in the price value coordinate system GUI component; generate a first straight line matching the first price and the operation type, wherein the first straight line is parallel to an X-axis and a Y-axis coordinate value of the first straight line is a Y-axis coordinate value corresponding to the first price value; and send the first price value and the operation type to a background server after controlling the display unit of the UE to superimpose and display the first straight line onto the GUI; and acquire a window message triggered by the user dragging a line on the GUI using the mouse or the finger and then releasing the line, determine whether the window message is terminated when the window message is passed down through an object-oriented program class to draw a second straight line, determine, when the window message is terminated, drawing of the second straight line as an erroneous operation and stop responding of the second straight line and send no operation type of the second straight line and no price value of the second straight line to the background server, and determine, when the window message is not terminated, drawing of the second straight line as a correct operation and respond to the second straight line and send the operation type and the price value of the second straight line to the background server; and the background server is configured to refresh lines of a price chart on the GUI based on the first price value and the operation type and return the refreshed price chart to the UE for display, wherein the UE is further configured to:
acquire a window message sent by the user, identify the user to determine a first identity of the user, and extract weight value data corresponding to the first identity; and
extract price value information about each straight line on the GUI, generate a respective piece of input data of the price value information about each straight line, perform a calculation on the respective piece of input data of the price value information about each straight line and the weight value data to obtain a respective calculation result for the respective piece of input data, determine a third straight line matching the window message by comparing the respective calculation result with a predetermined result, and determine the third straight line as a straight line responding to the window message.

13. A user equipment (UE), comprising:
a collecting unit configured to collect operation information about a user performing an operation of drawing a line using a mouse or a finger on a graphic user interface (GUI) under a price value coordinate system represented by a price value coordinate system GUI component;

a processing unit configured to control a display unit of the UE to display the price value coordinate system GUI component on the GUI and display a price value set in the price value coordinate system GUI component on a coordinate set on the GUI, the coordinate set comprising a plurality of coordinate values, and the price value set comprising a plurality of price values, with each coordinate value corresponding to a respective price value in the price value set, wherein the UE stores, in a memory, a correspondence between the coordinate set on the GUI and the price value set in the price value coordinate system GUI component; determine an operation type and an operation coordinate of the user's operation of drawing the line on the GUI based on the operation information, wherein the operation type comprises at least one of a buying operation and a selling operation, and the operation coordinate is a coordinate of a point where a horizontal straight line corresponding to the operation of drawing the line intersects the price value coordinate system represented by the price value coordinate system GUI component; calculate, based on the coordinate set on the GUI and the collected operation coordinate, differences between the operation coordinate and the plurality of coordinate values comprised in the coordinate set on the GUI to obtain a plurality of difference values, extract a first coordinate value corresponding to a minimum difference value from the plurality of difference values, and obtain a first price value corresponding to the first coordinate value based on the stored correspondence between the coordinate set on the GUI and the price value set in the price value coordinate system GUI component; and generate a first straight line matching the first price value and the operation type, wherein the first straight line is parallel to an X-axis and a Y-axis coordinate value of the first straight line is a Y-axis coordinate value corresponding to the first price value; and control the display unit of the UE to superimpose and display the first straight line onto the GUI; and a communication unit configured to send the first price value and the operation type to a background server, wherein the processing unit is further configured to acquire a window message triggered by the user dragging a line on the GUI using the mouse or the finger and then releasing the line, determine whether the window message is terminated when the window message is passed down through an object-oriented program class to draw a second straight line, determine, when the window message is terminated, drawing of the second straight line as an erroneous operation and stop responding of the second straight line and control the communication unit to send no operation type of the second straight line and no price value of the second straight line to the background server, and determine, when the window message is not terminated, drawing of the second straight line as a correct operation and respond to the second straight line and control the communication unit to send the operation type and the price value of the second straight line to the background server, wherein the processor is further configured to:

acquire a window message sent by the user, identify the user to determine a first identity of the user, and extract weight value data corresponding to the first identity; and extract price value information about each straight line on the GUI, generate a respective piece of input data of the price value information about each straight line, perform a calculation on the respective piece of input data and the weight value data to obtain a respective calculation result for the respective piece of input data of the price value information about each straight line, determine a third straight line matching the window message by comparing the respective calculation result with a predetermined result, and determine the third straight line as a straight line responding to the window message.

\* \* \* \* \*